Sept. 4, 1934.  F. SCHMIDT  1,972,716
CULTIVATOR
Filed March 18, 1933
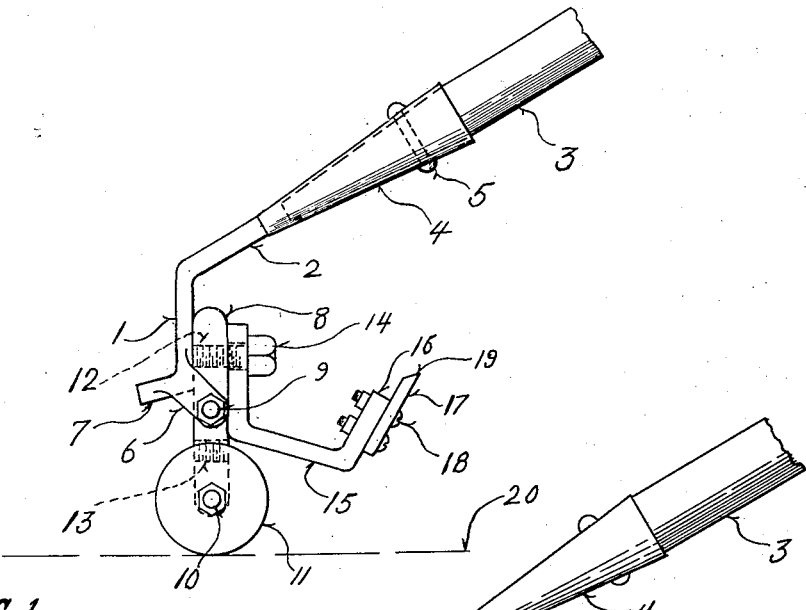
FIG.1.
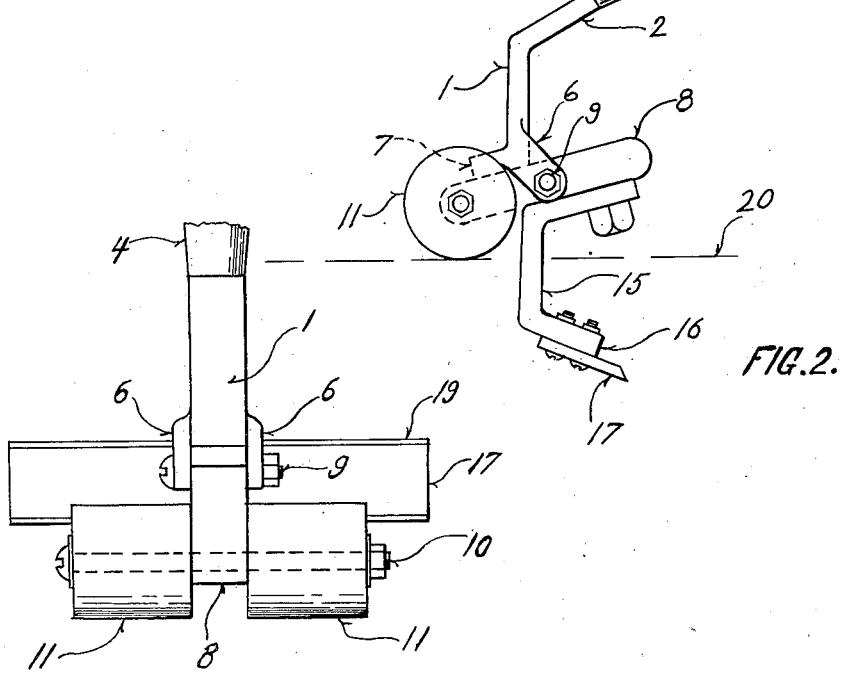
FIG.2.
FIG.3.
INVENTOR
*FRANK SCHMIDT*
BY
*Arthur R. Woolfolk*
ATTORNEY Patented Sept. 4, 1934

1,972,716

UNITED STATES PATENT OFFICE 1,972,716

CULTIVATOR

Frank Schmidt, Milwaukee, Wis.

Application March 18, 1933, Serial No. 661,427

5 Claims. (Cl. 97—59)

This invention relates to cultivators.

In cultivating soil it has been the practice heretofore to use a hoe and to chop the earth with the hoe by a downward swing imparted to the hoe by the operator. This, however, has caused a considerable amount of fatigue due particularly to the effort of lifting the hoe from the ground for each separate stroke, as well as the effort in swinging the hoe downwardly.

In addition to this, the ground is broken up by substantially vertical cuts, and also if a rock is hit by the hoe, a considerable jar is felt by the operator.

This invention is designed to overcome the above noted defects, and objects of this invention are to provide a novel form of cultivator which is so made that the operator is not required to lift the handle up and down, as in hoeing the ground. Instead, he is merely required to pull the handle back and forth with short, easy strokes without fatigue on his part and without any chance of a jar being imparted to him if a rock should be hit by the cultivator.

Further objects are to provide a novel form of cultivator which is so constructed that a slicing cut is made into the ground, as distinguished from a vertical downward cut, in which the depth of cut can be regulated by properly adjusting the device, in which the blade is removable and any width blade desired can be employed; and in which the blade can be completely removed from the device for sharpening whenever it is needed.

Further objects are to provide a cultivator which is especially good for any type of cultivation, for instance between rows of plants or in any other capacity, which is excellent for the removal of quack glass, as it can be adjusted to a position where it will not disturb the roots of the grass but will cut the grass off below the ground without disturbing the roots, if the device is adjusted to this position, in which the operator can cultivate a very much larger area of ground than is possible in the same length of time with a hoe or other device, and in which a thorough breaking up of the ground is obtained.

Further objects are to provide a cultivator in which although a straight blade is primarily used, nevertheless a rake or toothed blade could be employed and substituted for the straight blade, and in which a high grade steel blade could be used, though other parts of the device could be made of different material.

An embodiment of the invention is shown in the accompanying drawing, in which:

Figure 1 is a side elevation of the device with the handle broken away, such view showing the blade in raised position.

Figure 2 is a view corresponding to Figure 1 showing the blade in lowered position.

Figure 3 is a rear view of the device when in the position shown in Figure 1.

Referring to the drawing, it will be seen that the device comprises a body portion 1 which may be formed of metal and which is provided with an upwardly and angularly extending stem 2 to which the handle 3 is attached in any suitable manner. As shown in the drawing, the stem 2 may be provided with a conical or other shaped socket into which the handle extends, and the handle may be locked in the socket by means of a rivet or pin 5.

The body portion is provided with a pair of side lugs or ears 6 and with a rearwardly and downwardly projecting stop or finger 7.

A rocking lever-like member 8 is pivotally mounted upon a shaft or pivot pin 9. It is positioned between the ears 6 and the pin is carried by the ears. This pin may be in the form of a screw or other member and may be provided with a suitable nut, as indicated.

The lever-like member 8 carries a bottom shaft or lower shaft 10 which also may be provided with a nut and head as shown. Upon the shaft a pair of rollers or relatively wide wheels 11 are revolubly mounted. Preferably the wheels are made of wood, though obviously they could be made of other material as desired.

It is to be noted from reference to Figure 1 that the lever 8 is provided with two or more tapped holes, as indicated at 12 and 13, for selectively receiving the bolt 14.

A bracket 15 is locked by means of the bolt 14 to the lever 8. This bracket is provided with an upwardly turned portion 16 to which the blade 17 is removably secured in any suitable manner. As shown in the drawing, the blade 17 may be secured by means of screws or bolts 18 so that it can be readily removed for sharpening or for substitution of other blades.

It is preferable to form the blade 17 of a good grade of steel and to provide an upper bevelled edge 19.

In using the device the wheels 11 are rested upon the ground, as shown in Figure 1, the ground line being indicated by the line 20. The operator merely pulls the handle forwardly. This causes the lever 8 to rock into the position shown in Figure 2 and causes the blade 17 to enter the ground in a short slicing stroke, not solely as a vertical stroke, as in hoeing, but with a more horizontal slicing motion. The operator then pushes the device backwardly and the blade is lifted from the ground as the lever 8 rocks about the pivot pin 9. The operator continues to push the device back and forth, walking backwardly as he does so, and thus the entire ground passed over by the device is thoroughly broken up by short slicing strokes.

It is to be noted that the stop 7 arrests the rocking motion of the lever 8 when it rocks in a clockwise direction, as shown in Figure 2, and thus predetermines the amount of rocking of the lever.

If a deeper cut is desired, the bolt 14 is removed from the hole 12 and inserted into the hole 13, thus locking the blade in a lower position. Further it is clear that any length bracket could be used to fit the particular demands. In addition it is obvious that the bracket 15 and the lever 8 could be made integral with any length bracket desired.

The device from actual tests has been found to work with the utmost satisfaction and scarcely any effort is required of the operator, certainly only a fraction as much as that required in hoeing where the operator is required to lift the hoe and drive it downwardly for each stroke. In addition to the points enumerated hereinabove, it has been found that when a stone is struck by the blade, that the slicing motion tends to dislodge the stone, as distinguished from the downward driving motion of a hoe. In addition to this, there is no shock on the hands of the operator, as is the case when the hoe is struck sharply against a stone in its downward swing. It is obvious that the width of blade used would be determined by the clearance between adjacent rows of plants when the device is used for this purpose, and it is obvious that any number of blades may be provided and that they may be interchanged as needed. Also although a straight blade has been shown, it is to be understood that any other type of blade could be used, or even a rake-like blade if desired.

It is preferable to form the blade of a relatively high grade steel and this does not materially add to the cost of the device as it is only a small portion of the apparatus. Also, the wheels and handle may be formed of wood or other material as desired.

Although this invention has been described in considerable detail, it is to be understood that such description is intended as illustrative rather than limiting, as the invention may be variously embodied and is to be interpreted as claimed.

I claim:

1. A cultivator comprising a body portion, a handle attached thereto for pushing and pulling the body portion back and forth, supporting means adapted to rest upon the ground, a cutting means for making a slicing cut into the ground, and mechanism for automatically lifting the cutting means out of the ground on each back stroke and for forcing the cutting means into the ground on each forward stroke, said mechanism operating independently of any rocking of the said handle.

2. A cultivator comprising a body portion, a handle attached thereto, a lever pivoted to said body portion, wheels adapted to rest upon the ground and supporting said lever to support said body portion, and a digging member rigidly secured to said lever and adapted to rock with said lever, whereby when said body portion is moved back and forth said lever will be alternately raised from the ground and projected into the ground with a slicing stroke.

3. A cultivator comprising a body portion, a lever pivoted to said body portion, wheels revolubly carried by said lever and adapted to rest upon the ground to directly support said body portion from said lever, a handle projecting outwardly from said body portion, whereby said body portion may be pushed back and forth across the ground, and a digging member adjustably carried by said lever and rigidly related thereto, whereby said digging member and said lever rock as a unit.

4. A cultivator comprising a body portion, a handle projecting outwardly therefrom, a lever pivotally mounted on said body portion, supporting wheels revolubly carried by the lower end of said lever and adapted to rest upon the ground to support the cultivator, a bracket rigidly carried by said lever, and a knife removably and rigidly carried by said bracket.

5. A cultivator comprising a body portion, a handle projecting outwardly therefrom, a lever pivoted to said body portion, wheels revolubly carried by said lever and adapted to rest upon the ground to support said lever to thereby directly support said body portion, a bracket adjustably and rigidly carried by said lever, and a knife removably and rigidly carried by said bracket.

FRANK SCHMIDT.